(12) United States Patent
Yuan et al.

(10) Patent No.: US 12,213,109 B2
(45) Date of Patent: Jan. 28, 2025

(54) METHOD, DEVICE, AND COMPUTER READABLE MEDIUM FOR COMMUNICATION

(71) Applicant: NEC CORPORATION, Tokyo (JP)

(72) Inventors: Fang Yuan, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 632 days.

(21) Appl. No.: 17/426,210

(22) PCT Filed: Jan. 31, 2019

(86) PCT No.: PCT/CN2019/074279
§ 371 (c)(1),
(2) Date: Jul. 28, 2021

(87) PCT Pub. No.: WO2020/155061
PCT Pub. Date: Aug. 6, 2020

(65) Prior Publication Data
US 2022/0104194 A1    Mar. 31, 2022

(51) Int. Cl.
*H04W 72/0446* (2023.01)
*H04L 1/08* (2006.01)
*H04W 72/23* (2023.01)

(52) U.S. Cl.
CPC ........... *H04W 72/0446* (2013.01); *H04L 1/08* (2013.01); *H04W 72/23* (2023.01)

(58) Field of Classification Search
CPC ...... H04W 72/0446; H04W 72/23; H04L 1/08
(Continued)

(56) References Cited

U.S. PATENT DOCUMENTS

2019/0104551 A1    4/2019  Deenoo et al.
2021/0235453 A1*   7/2021  Matsumura ........... H04L 1/0068

FOREIGN PATENT DOCUMENTS

CN    106535244 A    3/2017
CN    107852756 A    3/2018
(Continued)

OTHER PUBLICATIONS

AU Office Action for AU Application No. 2019426286, mailed on Mar. 1, 2023.
(Continued)

*Primary Examiner* — Chi Tang P Cheng

(57) ABSTRACT

Embodiments of the present disclosure provide methods, devices and computer readable media for multi-TRP communication. In a method for communication, a terminal device receives control information from at least one of a first network device and a second network device. The terminal device determines, from the control information, a first parameter for communication of a first data between the first network device and the terminal device and a second parameter for communication of a second data between the second network device and the terminal device, and the first data and the second data are identical. The terminal device performs, based on the first and second parameters, the communication of the first data with the first network device and the communication of the second data with the second network device. The embodiments of the present disclosure propose a new design of control information for multi-TRP communication.

16 Claims, 10 Drawing Sheets

(58) Field of Classification Search
USPC .......................................................... 370/336
See application file for complete search history.

(56) References Cited

FOREIGN PATENT DOCUMENTS

| JP | 2017-060176 A | 3/2017 |
|----|---------------|--------|
| JP | 2018-166346 A | 10/2018 |
| WO | 2017/024464 A1 | 2/2017 |
| WO | 2017/173051 A1 | 10/2017 |
| WO | 2018/201494 A1 | 11/2018 |

OTHER PUBLICATIONS

InterDigital Communications, LLC, "COMP Joint Transmission using Multiple Redundancy Versions", 3GPP TSG RAN WG1 Meeting #65, R1-111347, May 9-13, 2011, pp. 1-7.
Written opinion for PCT/CN2019/074279 dated Mar. 28, 2019.
International search report for PCT/CN2019/074279 dated Mar. 28, 2019.
1 AU Office Action for AU Application No. 2019426286, mailed on May 19, 2023.
Australian Office Action for AU Application No. 2019426286 mailed on Jul. 13, 2022.
Huawei et al., 'Enhancements on Multi-TRP/panel Transmission', 3GPP TSG RAN WG1 Meeting #95, R1-1812243, Nov. 12-16, 2018.
ZTE, 'Enhancements on Multi-TRP/panel Transmission', 3GPP TSG RAN WG1 Meeting #95, R1-1812256, Nov. 12-16, 2018.
Qualcomm Incorporated, 'Multi-TRP Enhancements', 3GPP TSG RAN WG1 Meeting #95, R1-1813442, Nov. 12-16, 2018.
Huawei et al., 'Single PDCCH based Multi-TRP/panel Transmission', 3GPP TSG RAN WG1 Meeting #95, R1-1813696, Nov. 12-16, 2018.
Huawei et al., 'Evaluation Results for Multi-TRP/panel Transmission with Higher Reliability/Robustness', 3GPP TSG RAN WG1 Meeting #95, R1-1813698, Nov. 12-16, 2018.
Extended European Search Report for EP Application No. 19913554.2, dated on Sep. 23, 2022.
Huawei et al.: "Enhancements on multi-TRP/panel transmission", 3GPP DRAFT;R1-1900017, Jan. 20, 2019.
LG Electronics: "Enhancements on multi-TRP/panel transmission", 3GPP DRAFT;R1-1812581, Nov. 11, 2018.
MediaTek Inc: "Multi-TRP and Multi-panel transmission", 3GPP DRAFT;R1-1707837, May 7, 2017.
MCC Support: Draft Report of 3GPP TSG RAN WG1#95 v0.2.0, _R1-190xxxxx, Dec. 5, 2018.
Japanese Office Action for JP Application No. 2021-544536 mailed on Sep. 6, 2022 with English Translation.
Qualcomm Incorporated, "Multi-TRP Enhancements", 3GPP TSG-RAN WG1 Meeting AH-1901, R1-1900905, Jan. 12, 2019.

\* cited by examiner

METHOD, DEVICE, AND COMPUTER READABLE MEDIUM FOR COMMUNICATION

CROSS-REFERENCE TO RELATED APPLICATIONS

This application is a National Stage of International Application No. PCT/CN2019/074279 filed Jan. 31, 2019.

FIELD

Embodiments of the present disclosure generally relate to the field of communication, and more particularly, to multi-TRP communication.

BACKGROUND

The latest developments of the 3GPP standards are referred to as Long Term Evolution (LTE) of Evolved Packet Core (EPC) network and Evolved UMTS Terrestrial Radio Access Network (E-UTRAN), also commonly termed as '4G'. In addition, the term '5G New Radio (NR)' refers to an evolving communication technology that is expected to support a variety of applications and services. 5G NR is part of a continuous mobile broadband evolution promulgated by Third Generation Partnership Project (3GPP) to meet new requirements associated with latency, reliability, security, scalability (for example, with Internet of Things (IoTz)), and other requirements. Some aspects of 5G NR may be based on the 4G Long Term Evolution (LTE) standard.

Recently, a study is carried out for reliability/robustness enhancement of the ultra-reliable low latency communications (URLLC) with multi-TRP/panel/beam, including the case of ideal backhaul. For the physical downlink shared channel (PDSCH)/physical uplink shared channel (PUSCH) where the same data, such as the same transport block (TB), is transmitted, the number of the TRPs/panels/beams and the configuration/indication mechanism of TB repetition are discussed. Other enhancements are not excluded. For the physical downlink control channel (PDCCH)/physical uplink control channel (PUCCH), the number of TRPs/panels/beams and repetition/diversity of the downlink control information (DCI)/uplink control information (UCI) are discussed. Other enhancements are not excluded.

SUMMARY

In general, example embodiments of the present disclosure provide a solution for multi-TRP communication.

In a first aspect, there is provided a method for communication. The method comprises receiving, at a terminal device, control information from at least one of a first network device and a second network device. The method also comprises determining, from the control information, a first parameter for communication of a first data between the first network device and the terminal device and a second parameter for communication of a second data between the second network device and the terminal device. The first data and the second data are identical. The method further comprises performing, based on the first and second parameters, the communication of the first data with the first network device and the communication of the second data with the second network device.

In a second aspect, there is provided a method for communication. The method comprises determining, at a first network device, a first parameter for communication of a first data between the first network device and a terminal device and a second parameter for communication of a second data between a second network device and the terminal device, the first data and the second data being identical. The method also comprises generating control information for the terminal device to determine the first and second parameters. The method further comprises transmitting the control information to the terminal device.

In a third aspect, there is provided a terminal device. The terminal device comprises a processor and a memory storing instructions. The memory and the instructions are configured, with the processor, to cause the terminal device to receive control information from at least one of a first network device and a second network device. The memory and the instructions are also configured, with the processor, to cause the terminal device to determine, from the control information, a first parameter for communication of a first data between the first network device and the terminal device and a second parameter for communication of a second data between the second network device and the terminal device. The first data and the second data are identical. The memory and the instructions are further configured, with the processor, to cause the terminal device to perform, based on the first and second parameters, the communication of the first data with the first network device and the communication of the second data with the second network device.

In a fourth aspect, there is provided a network device. The network device comprises a processor and a memory storing instructions. The memory and the instructions are configured, with the processor, to cause the network device to determine a first parameter for communication of a first data between the network device and a terminal device and a second parameter for communication of a second data between a further network device and the terminal device, the first data and the second data being identical. The memory and the instructions are also configured, with the processor, to cause the network device to generate control information for the terminal device to determine the first and second parameters. The memory and the instructions are further configured, with the processor, to cause the network device to transmit the control information to the terminal device.

In a fifth aspect, there is provided a computer readable medium having instructions stored thereon. The instructions, when executed on at least one processor of a device, cause the device to carry out the method in the first aspect.

In a sixth aspect, there is provided a computer readable medium having instructions stored thereon. The instructions, when executed on at least one processor of a device, cause the device to carry out the method in the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION OF EMBODIMENTS

Figure 1:
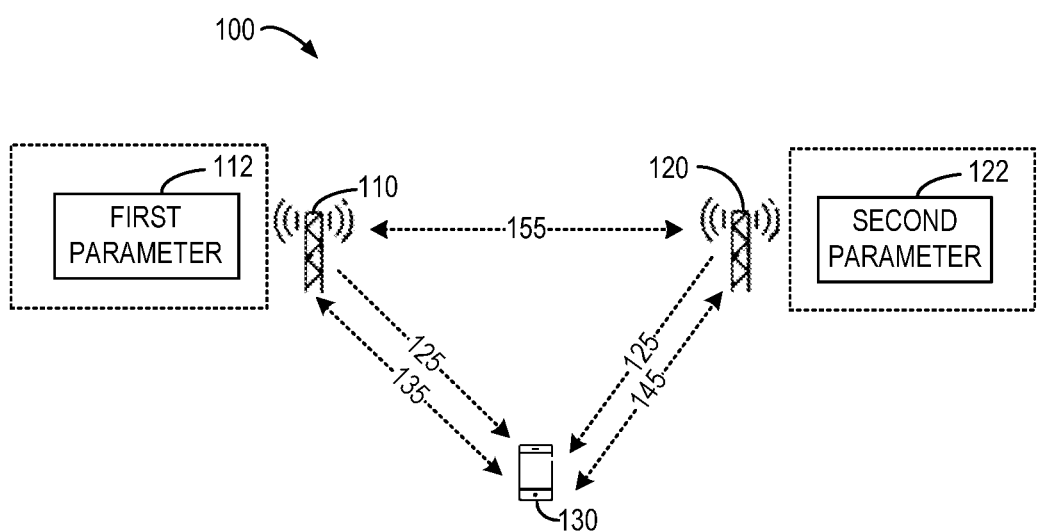
FIG. 1 is a schematic diagram of a communication environment in which some embodiments of the present disclosure can be implemented.

Principles of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "transmission/reception point" may generally indicate a station communicating with the user equipment. However, the transmission/reception point may be referred to as different terms such as a base station (BS), a cell, a Node-B, an evolved Node-B (eNB), a next generation NodeB (gNB), a Transmission Reception Point (TRP), a sector, a site, a base transceiver system (BTS), an access point (AP), a relay node (RN), a remote radio head (RRH), a radio unit (RU), an antenna, and the like.

That is, in the context of the present disclosure, the transmission/reception point, the base station (BS), or the cell may be construed as an inclusive concept indicating a portion of an area or a function covered by a base station controller (BSC) in code division multiple access (CDMA), a Node-B in WCDMA, an eNB or a sector (a site) in LTE, a gNB or a TRP in NR, and the like. Accordingly, a concept of the transmission/reception point, the base station (BS), and/or the cell may include a variety of coverage areas such as a megacell, a macrocell, a microcell, a picocell, a femtocell, and the like. Furthermore, such concept may include a communication range of the relay node (RN), the remote radio head (RRH), or the radio unit (RU).

In the context of the present disclosure, the user equipment and the transmission/reception point may be two transmission/reception subjects, having an inclusive meaning, which are used to embody the technology and the technical concept disclosed herein, and may not be limited to a specific term or word. Furthermore, the user equipment and the transmission/reception point may be uplink or downlink transmission/reception subjects, having an inclusive meaning, which are used to embody the technology and the technical concept disclosed in connection with the present embodiment, and may not be limited to a specific term or word. Herein, an uplink (UL) transmission/reception is a scheme in which data is transmitted from user equipment to a base station. Alternatively, a downlink (DL) transmission/reception is a scheme in which data is transmitted from the base station to the user equipment.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

FIG. 1 is a schematic diagram of a communication environment 100 in which some embodiments of the present disclosure can be implemented. In the communication environment 100, there are two network devices 110, 120 and a terminal device 130. The terminal device 130 may communicate with one or both of the network devices 110, 120 via wireless communication links. In some embodiments, the network devices 110 and 120 may be two base stations serving the terminal device 130 cooperatively. In this case, the network devices 110 and 120 may communicate with each other via a communication link 155.

In some other embodiments, the network devices 110 and 120 may be different transmission/reception units of one base station serving the terminal device 130. In some further embodiments, the network devices 110 and 120 may be two TRPs or two panels or two cells or two groups of antenna ports/elements within one TRP/panel/cell. As used herein, the wireless communication involving a plurality of network devices in communication with a terminal device (such as the communication environment 100) may also be referred to as multi-TRP communication.

It is to be understood that the number of network devices and the number of terminal devices as shown in FIG. 1 are only for the purpose of illustration without suggesting any limitations. Actually, the communication environment 100 may include any suitable number of network devices and any suitable number of terminal devices adapted for implementing embodiments of the present disclosure. In other words, embodiments of the present disclosure may also be applicable to a scenario where a terminal device communicates with more than two network devices.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission/Reception Point (TRP), a Remote Radio Unit (RRU), a radio head (RH), a remote radio head (RRH), a low power node such as a femto node, a pico node, and the like.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UEs as examples of terminal devices and the terms "terminal device" and "user equipment" (UE) may be used interchangeably in the context of the present disclosure.

The communications in the communication environment 100 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In general, the first network device 110 and the terminal device 130 may perform communication of a first data 135 between them. For example, the first network device 110 may transmit the first data 135 to the terminal device 130, and the terminal device 130 may receive the first data 135 from the first network device 110. This communication is known as downlink transmission. For example, the first data 135 can be transmitted on a PDSCH channel in NR. Alternatively, the terminal device 130 may transmit the first data 135 to the first network device 110, and the first network device 110 may receive the first data 135 from the terminal device 130. This communication is known as uplink transmission. For example, the first data 135 can be transmitted on a PUSCH channel in NR. In some embodiments, the first data 135 and the second data 145 may include any data that can be transmitted between a network device and a terminal device, including user plane data, control plane data, or the like.

Before the communication of the first data 135 between the first network device 110 and the terminal device 130, the first network device 110 may transmit first downlink control information or first uplink control information to the terminal device 130. For example, the terminal device 130 may determine from the first downlink control information how the first network device 110 is to transmit the first data 135, such as time-frequency resources, a modulation and coding scheme (MCS), a redundancy version (RV), a quasi co-location (QCL) configuration, and any other possible parameters for transmitting the first data 135. The downlink and uplink control information can be transmitted on a PDCCH in NR.

In a similar way, the terminal device 130 may determine from the first uplink control information how the terminal device 130 is to transmit the first data 135, such as time-frequency resources, a RV, a MCS, and any other possible parameters for transmitting the first data 135. In other words, the first downlink or uplink control information may indicate a parameter for the communication of the first data 135 between the first network device 110 and the terminal device 130.

Likewise, the second network device 120 and the terminal device 130 may perform communication of a second data 145 between them. For example, the second network device 120 may transmit the second data 145 to the terminal device 130, and the terminal device 130 may receive the second data 145 from the second network device 120. This communication is known as downlink transmission. For example, the second data 145 can be transmitted on another PDSCH channel in NR. Alternatively, the terminal device 130 may transmit the second data 145 to the second network device 120, and the second network device 120 may receive the second data 145 from the terminal device 130. This communication is known as uplink transmission. For example, the second data 145 can be transmitted on another PUSCH channel in NR.

Before the communication of the second data 145 between the second network device 120 and the terminal device 130, the second network device 120 may transmit second downlink control information or second uplink control information to the terminal device 130. For example, the terminal device 130 may determine from the second downlink control information how the second network device 120 is to transmit the second data 145, such as time-frequency resources, a RV, a MCS, a QCL configuration, and any other possible parameters for transmitting the second data 145.

In a similar way, the terminal device 130 may determine from the second uplink control information how the terminal device 130 is to transmit the second data 145, such as time-frequency resources, a MCS, and any other possible parameters for transmitting the second data 145. In other words, the second downlink or uplink control information may indicate a parameter for the communication of the second data 145 between the second network device 120 and the terminal device 130.

In some cases, the first data 135 may be identical to the second data 145. For example, this can be done for improving the reliability and robustness of the communication of the same data, and may be used in a URLLC scheme. However, there is no efficient solution for the first network device 110 and the second network device 120 to schedule transmission of identical data from or to the two network devices, such as, for URLLC transmission. In current specifications, data (such as a TB) repeating is not considered under multi-TRP.

In view of the above problems and other potential problems in the traditional solutions, embodiments of the present disclosure provide a solution for multi-TRP communication, and particularly propose a new design of control information for multi-TRP communication. In some embodiments, the repeated data (such as TBs) may be indicated by same control information (such as a single DCI) and inter-TRP constraints are introduced to limit the payload of the control information. For example, one DCI may schedule the repeated TBs for multi-TRP transmission. The DCI may not increase the DCI payload of a DCI as defined in Release 15 of the 3GPP specifications.

In other words, as shown in FIG. 1, either or both of the first network device 110 and the second network device 120 may transmit same control information 125 to the terminal device 130. The terminal device 130 may determine, from the control information 125, a first parameter 112 for the communication of the first data 135 and a second parameter 122 for the communication of the second data 145. Principles and implementations of embodiments of the present disclosure will be described in detail below.

Figure 2:
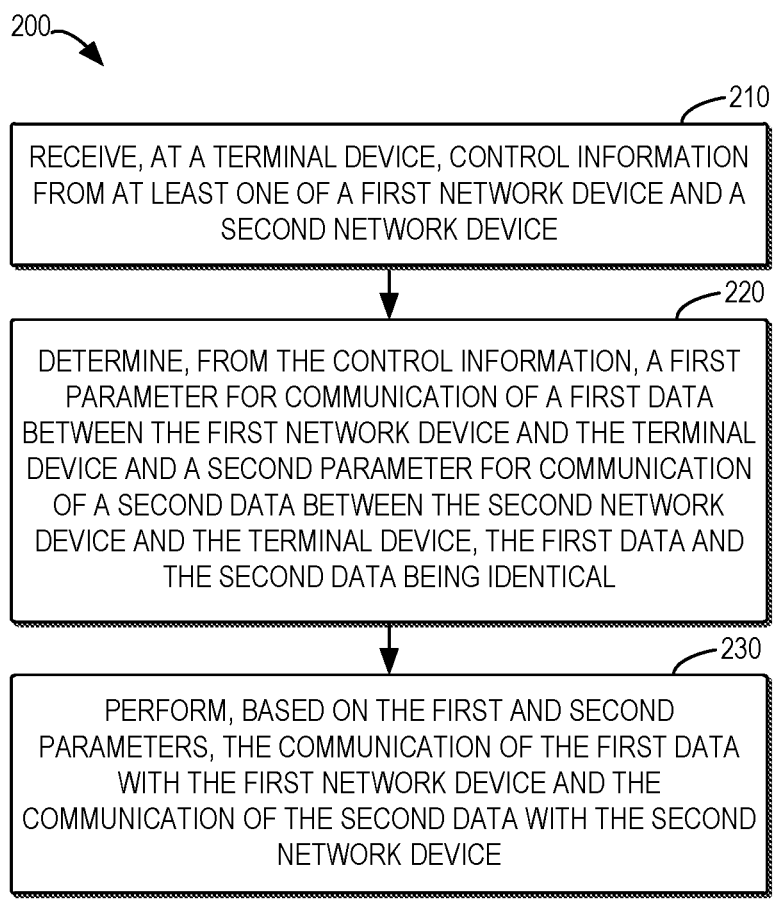
FIG. 2 shows a flowchart of an example method in accordance with some embodiments of the present disclosure.

FIG. 2 shows a flowchart of an example method 200 in accordance with some embodiments of the present disclosure. The method 200 can be implemented at a terminal device, such as the terminal device 130 as shown in FIG. 1. Additionally or alternatively, the method 200 can also be implemented at other terminal devices not shown in FIG. 1. For the purpose of discussion, the method 200 will be described with reference to FIG. 1 as performed by the terminal device 130 without loss of generality.

At block 210, the terminal device 130 receives the control information 125 from at least one of the first network device 110 and the second network device 120. As described above, the terminal device 130 may determine, from the control information 125, both the first parameter 112 for the communication of the first data 135 and the second parameter 122 for the communication of the second data 145. Accordingly, it may be necessary that any one of the first network device 110 and the second network device 120 transmits the control information 125 to the terminal device 130. However, if both of the first network device 110 and the second network device 120 transmit the control information 125 to the terminal device 130, there may be higher reliability for the terminal device 130 to receive the control information 125, and thus can receive both the first data 135 and the second data 145. This will be further described with reference to FIG. 3.

Figure 3:
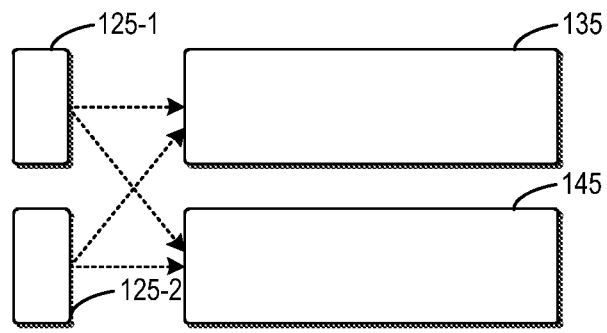
FIG. 3 shows an example in which two copies of control information transmitted by a first network device and a second network device are associated with both a first data transmitted by the first network device and a second data transmitted by the second network device, in accordance with some embodiments of the present disclosure.

FIG. 3 shows an example in which two copies of the control information 125 transmitted by the first network device 110 and second network device 120 are associated with both the first data 135 transmitted by the first network device 110 and the second data 145 transmitted by the second network device 120, in accordance with some embodiments of the present disclosure. As shown, the first copy 125-1 of the control information 125 transmitted by one of the first network device 110 and the second network device 120 is associated with both the first data 135 and the second data 145. In other words, the terminal device 130 may receive both of the first data 135 and the second data 145 based on the first copy 125-1 of the control information 125.

Analogously, the second copy 125-2 of the control information 125 transmitted by the other one of the first network device 110 and the second network device 120 is also associated with both the first data 135 and the second data 145. In other words, the terminal device 130 may receive both of the first data 135 and the second data 145 based on the second copy 125-2 of the control information 125. Therefore, in case any one of the first copy 125-1 and the second copy 125-2 of the control information 125 is missed or lost, the terminal device 130 can still receive both the first data 135 and the second data 145. The first copy 125-1 and the second copy 125-2 can be transmitted on PDCCHs with different aggregation levels. For example, the first copy 125-1 can be transmitted on a PDCCH with an aggregation level 4 and the second copy 125-2 can be transmitted on a PDCCH with an aggregation level 8, where the transmission is adapted to the channel between the corresponding network device and the terminal device for robustness.

In some embodiments, the control information 125 may have a similar format to one of various DCI formats as defined in the 3GPP specifications, for example, DCI format 1_1. In this event, in order to distinguish the control information 125 from other various existing DCIs as defined in 3GPP specifications, the first network device 110 and the second network device 120 may scramble the control information 125 using a unique radio network temporary identity (RNTI) when transmitting the control information 125. The unique RNTI is different from the cell radio network temporary identity (C-RNTI) and is dedicated to the terminal device 130. Therefore, in receiving the control information 125, the terminal device 130 may descramble the control information 125 using the unique RNTI. If the descrambling is successful, the terminal device 130 then knows that the control information 125 carries both the first parameter 112 for communicating with the first network device 110 and the second parameter 122 for communicating with the second network device 120.

At block 220, the terminal device 130 determines, from the control information 125, the first parameter 112 for communication of the first data 135 between the first network device 110 and the terminal device 130, and the second parameter 122 for communication of the second data 145 between the second network device 120 and the terminal device 130. The first data 135 and the second data 145 are identical, for example, from the same transport block (TB). Depending on how the network device 110 and the second network device 120 explicitly or implicitly indicate the first parameter 112 and the second parameter 122 in the control information 125, there may be various manners for the terminal device 130 to determine the first parameter 112 and the second parameter 122 from the control information 125.

As an example, the terminal device 130 may obtain the first parameter 112 indicated in the control information 125. Then, the terminal device 130 may determine the second parameter 122 based on a predefined relation between the first parameter 112 and the second parameter 122. In other words, the control information 125 may only indicate the first parameter 112, and the second parameter 122 may be obtained according to the predefined relation and the indicated first parameter 112. As such, the payload of the control information 125 may be reduced and the terminal device 130 may determine the first parameter 112 and the second parameter 122 in a simple way. In some embodiments, first resource assignment for the communication of the first data 135 and second resource assignment for the communication of the first data 135 may be indicated in such a manner. This will be detailed with reference to FIGS. 4A-4C in the following.

Figure 4A:
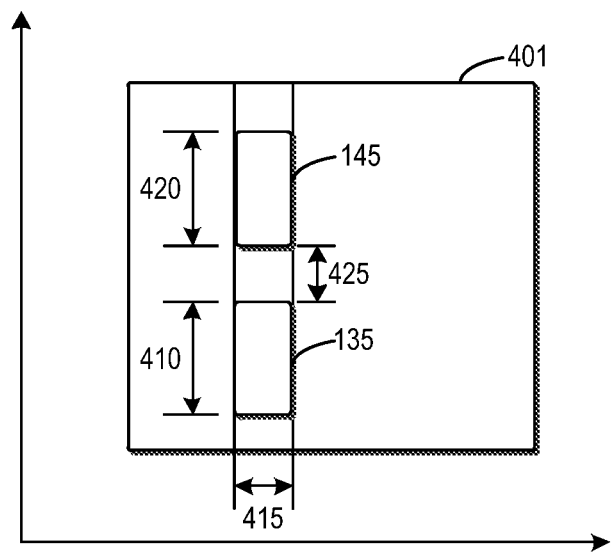
FIGS. 4A-4C show various examples of communication resource assignment for the first network device and the second network device in accordance with some embodiments of the present disclosure.
Figure 4B:
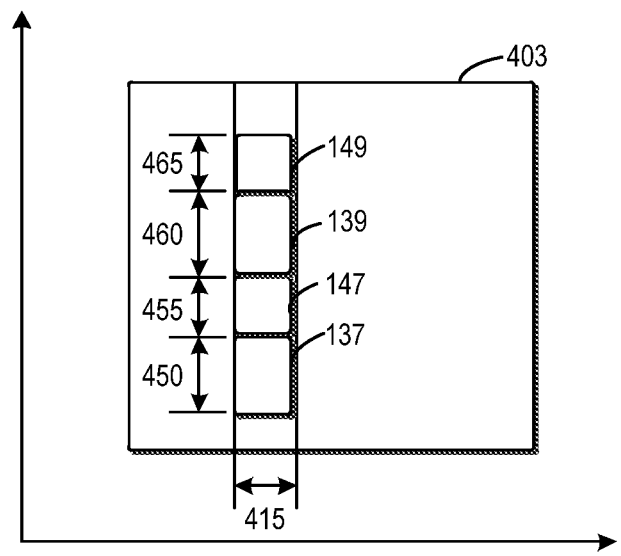
Figure 4C:
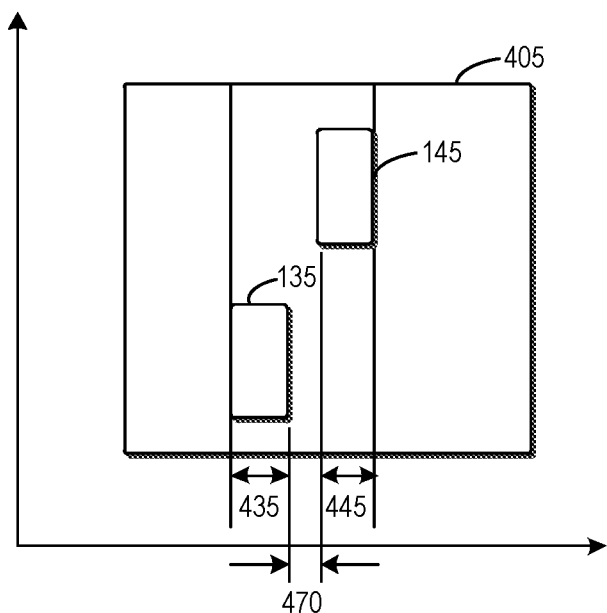

FIGS. 4A-4C show various examples of communication resource assignment for the first network device 110 and the second network device 120 in accordance with some embodiments of the present disclosure. In FIGS. 4A-4C, the horizontal axis represents time resources and the vertical axis represents frequency resources. As shown in FIG. 4A, in a period 415 of a slot 401, the first data 135 may be transmitted using a first frequency resource 410, and the second data 145 may be transmitted using a second frequency resource 420, which has a predefined offset 425 from the first frequency resource 410.

In some embodiments, the slot 401 may be a slot as defined in the 3GPP specifications (such as 5G NR). The offset 425 can be preconfigured by RRC signaling. Because the predefined offset 425 is known by the terminal device 130, the control information 125 may only indicate the first frequency resource 410, so as to limit the payload of the control information 125. The offset 425 may be counted with a unit of resource blocks, and start from the lowest or highest index of resource block of the first frequency resource 410. In the example, only one start and time duration within the slot 401 for the period 415 is indicated, which is the same for both the first data 135 and the second data 145.

That is, in the example of FIG. 4A, the first parameter 112 may be the first frequency resource 410 and the second parameter 122 may be the second frequency resource 420. The terminal device 130 may determine the second frequency resource 420 based on the first frequency resource 410 and a predefined offset 425 between the first frequency resource 410 and the second frequency resource 420. In this way, only one frequency resource needs to be dynamically indicated in the control information 125. It is noted that the predefined offset 425 may be a positive offset or a negative offset. This will be further discussed with reference to FIG. 5.

Figure 5:
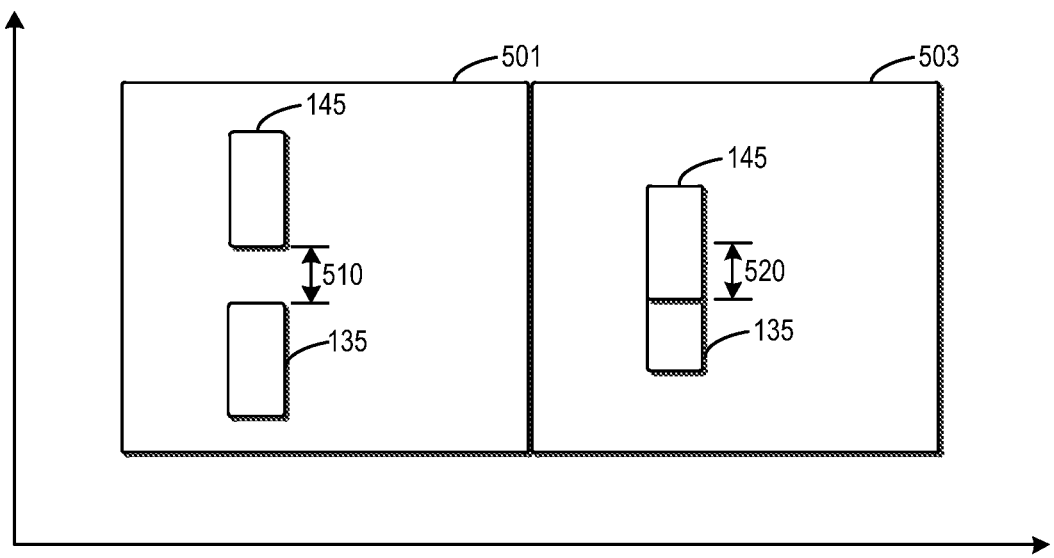
FIG. 5 shows an example of a positive offset between a first frequency resource for the first network device and a second frequency resource for the second network device, and an example of a negative offset between the first frequency resource and the second frequency resource, in accordance with some embodiments of the present disclosure.

FIG. 5 shows an example of a positive offset 510 between a first frequency resource for the first network device 110 and a second frequency resource for the second network device 120, and an example of a negative offset 520 between the first frequency resource and the second frequency resource, in accordance with some embodiments of the present disclosure. In FIG. 5, the horizontal axis represents time resources and the vertical axis represents frequency resources. As shown in a slot 501, the predefined offset 510 between the frequency resource of the first data 135 and the frequency resource of the second data 145 is a positive offset, so that the first and second frequency resources are separated by the offset 510. In contrast, as shown in a slot 503, the predefined offset 520 between the frequency resource of the first data 135 and the frequency resource of the second data 145 is a negative offset. In this event, the first and second frequency resources may be overlapped with each other. As such, the possible range of the second frequency resource may be extended.

Figure 6:
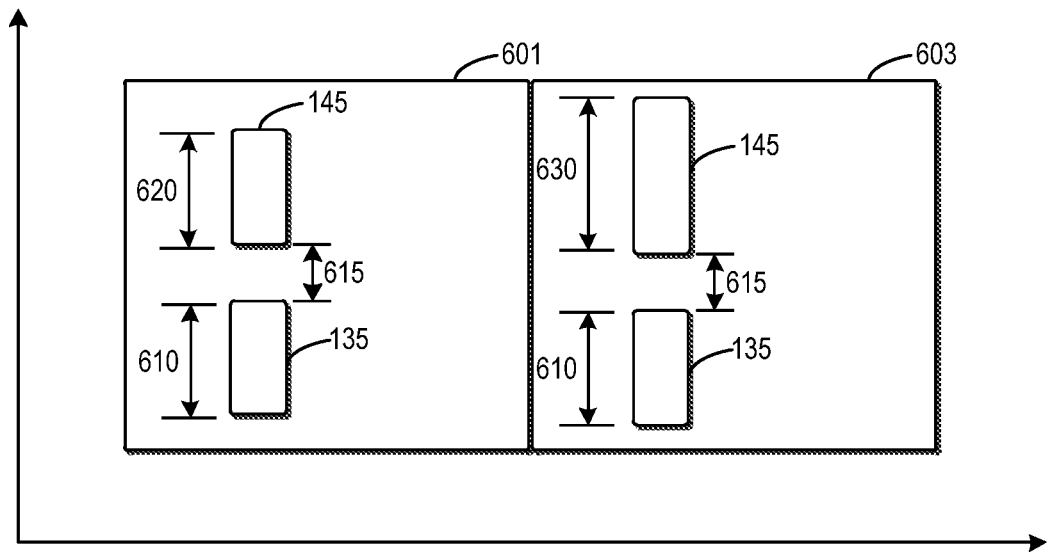
FIG. 6 shows an example in which a MCS for the first network device is the same as a MCS for the second network device, and an example in which the MCS for the first network device is different from the MCS for the second network device, in accordance with some embodiments of the present disclosure.

An employed MCS and/or rank indicator (RI) may also influence the determination of the second frequency resource. FIG. 6 shows an example in which a MCS and a RI for the first network device 110 is the same as a MCS and a RI for the second network device 120, and an example in which the MCS and the RI for the first network device 110 is different from the MCS and RI for the second network device 120, in accordance with some embodiments of the present disclosure. In FIG. 6, the horizontal axis represents time resources and the vertical axis represents frequency resources. As shown in FIG. 6, the terminal device 130 may obtain from the control information 125 a first frequency resource 610 for the first network device 110 to transmit the first data 135 in an example slot 601. Then, according to a predefined offset 615, the terminal device 130 may determine a second frequency resource 620 for the second network device 120 to transmit the second data 145 in the example slot 601.

When the amount of the second frequency resource 620 is configured to be the same as the amount of the first frequency resource 610, the MCS and the RI for transmission can be indicated as the same for the first data 135 and the second data 145. It means that, only one MCS and RI value is indicated in the control information 125 (such as, a DCI), which reduces the DCI overhead. This is schematically shown in the example slot 601 through a same height shared by the first frequency resource 610 and the second frequency resource 620.

When the amount of the second frequency resource 620 can be different from the amount of the first frequency resource 610, the control information 125 can indicate two MCSs and/or two RIs, but indicate only one resource assignment for the first frequency resource 610. The MCS and RI for the second data 145 may be derived in a differential way. That is, only the differential value of MCS and RI for the second data 145 between the MCS and RI for the first data 135 is indicated. The RI value may be implicitly derived from a demodulation reference signal (DMRS) indication. In other words, if the MCS and/or RI employed by the first network device 110 is different from the MCS and/or RI employed by the second network device 120, the amount of the first frequency resource 610 may be different from the amount of the second frequency resource 620, since the TB size of the first data 135 and the second data 145 are the same. That is, if the terminal device 130 determines that a first MCS and/or RI for the first network device 110 to transmit the first data 135 is different from a second MCS and/or RI for the second network device 120 to transmit the second data 145, the terminal device 130 may determine a second amount of the second frequency resource different from a first amount of the first frequency resource.

For example, as shown in a slot 603, it is assumed that an index of the MCS (for example, the index of an MCS as defined in the 3GPP specifications) employed by the first network device 110 is greater than an index of the MCS employed by the second network device 120. In this event, the terminal device 130 may determine a second amount of the second frequency resource 630 greater than a first amount of the first frequency resource 610, by considering the factors such as MCS and/or RI differences and the TB size indicated for the first data 135. This is schematically shown in the example slot 603 through the height of the first frequency resource 610 less than the height of the second frequency resource 630. As such, the amount of the first and second frequency resources can be determined more reasonably.

Alternatively, when the amount of the second frequency resource 620 can be different from the amount of the first frequency resource 610, the control information 125 can indicate two resource assignments and only one MCS and/or one RI for the first data 135. The terminal device 130 determines the second MCS and/or RI for the second network device 120 to transmit the second data 145, based on the TB size and the first MCS and/or RI for the first network device 110 to transmit the first data 135, and the second frequency resource 620. For example, the RI can be assumed as the same for the first data 135 and the second data 145, but the MCS can be determined as different for the first data 135 and the second data 145.

In the foregoing, a predefined offset is described as an example of the predefined relation between the first frequency resource for transmitting the first data 135 and the second frequency resource for transmitting the second data 145. In some other embodiments, the first frequency resource and the second frequency resource may have other predefined relations. For example, FIG. 4B shows that the frequency resources for transmitting the first data 135 are interleaving with the frequency resources for transmitting the second data 145.

In particular, in a period 415 of a slot 403, a first portion 137 of the first data 135 is transmitted using a frequency resource 450, a first portion 147 of the second data 145 is transmitted using a frequency resource 455, a second portion 139 of the first data 135 is transmitted using a frequency resource 460, and a second portion 149 of the second data 145 is transmitted using a frequency resource 465. The frequency resources 450, 455, 460, and 465 are interleaving one by one as illustrated in FIG. 4B. In some instances, the frequency resources 450 and 460 may be referred to as a first comb, and the frequency resources 455 and 465 may be referred to as a second comb.

In the example of FIG. 4B, the terminal device 130 may determine the first frequency resource 450 from a first set of resources 450 and 460 indicated in the control information 125, and then determine the second frequency resource 455 from a second set of resources 455 and 460 interleaving with the first set of resources 450 and 460. As such, only one set of frequency resources needs to be indicated in the control information 125. It is to be understood that the specific number of frequency resources for transmitting the first data 135 and the specific number of frequency resources for transmitting the second data 145 are only for example, without suggesting any limitations. In other embodiments, the first and second sets of resources may include any number of frequency resources.

In the examples shown in the FIGS. 4A and 4B, the period for transmitting the first data 135 and the period for transmitting the second data 145 are a same portion of the period 415, which may be indicated in the control information 125. In some other embodiments, the first data 135 and the second data 145 may be transmitted in different periods. This is explained with reference to FIG. 4C, in the example of FIG. 4C, the first parameter 112 may comprise a first period 435 and the second parameter 122 may comprise a second period 445. The terminal device 130 may determine the first period 435 as a first portion of the period 415 indicated in the control information 125. Then, the terminal device 130 may determine the second period 445 as a different second portion of the period 415. In some embodiments, the first period 435 and the second period 445 may be two halves of the period 415 indicated in the control information 125. In this way, the first data 135 and the second data 145 may be communicated more flexibly in time domain.

The start and time duration of the periods 435 and 445 can be indicated in the control information 125 (such as a DCI) respectively for the first data 135 and the second data 145. For example, the control information 125 (such as a DCI) can indicate two start and length indication values (SLIV), indicating the start and time durations of the periods 435 and 445 for the first data 135 and the second data 145, respectively. The two SLIV values indicated by the DCI can have two separate DCI fields, where bits of code points in each DCI field independently indicate a SLIV value.

Alternatively, a DCI field can indicate an index for a pair of SLIV values, where the pair of SLIV values is configured by a higher layer which consists of two SLIV values. An example of a DCI indicating a pair of SLIV values is shown in Table 1 as below, where the first and second SLIVs in the pair are for the first and second data respectively. Further, a DCI field can indicate an index for a SLIV value (that is, the first period 435) for the first data 135, and the SLIV value (that is, the second period 445) for the second data 145 is derived based on a fixed time offset 470 relative to the start and time duration for the first data 135 (that is, the first period 435). In this case, the time durations for the first data 135 and the second data 145 can be configured as the same. In some embodiments, the time offset can be configured as zero.

TABLE 1

| DCI indicating a SLIV value pair | |
|---|---|
| Code point of the DCI field | SLIV value pair |
| 00 | $1^{st}$ Pair: {SLIV1, SLIV2} |
| 01 | $2^{nd}$ Pair: {SLIV3, SLIV4} |
| 10 | $3^{rd}$ Pair: {SLIV5, SLIV6} |
| 11 | $4^{th}$ Pair: {SLIV7, SLIV8} |

As mentioned above, there may be various manners for the terminal device 130 to determine the first parameter 112 and the second parameter 122 from the control information 125. In some embodiments, the terminal device 130 may obtain the first parameter 112 indicated in the control information 125, and then determine the second parameter 122 as identical to the first parameter 112. For example, these identical first parameter 112 and second parameter 122 may comprise parameters related to a hybrid automatic repeat request (HARQ) identity, an acknowledgement (ACK)/negative acknowledgement (NACK) resource indicator (ARI), a new data indicator (NDI), a downlink assignment index (DAI), a DMRS seed, or the like, and any combination thereof. As such, some parameters common to both the first network device 110 and the second network device 120 may be indicated only once in the control information 125, so as to reduce the payload of the control information 125.

If the first data 135 and the second data 145 are not overlapped by any resource element in time and frequency resource assignments, the same DMRS ports can be indicated in the control information 125 (such as a DCI) for receiving the first data 135 and the second data 145. For example, both the first data 135 and the second data 145 can be indicated with the DMRS port index 0 and 1 for channel estimation in data reception in the case of two-layer transmission, where RI=2 for both the first data 135 and the second data 145. In this case, only one set of DMRS ports (port index 0 and 1) needs to be indicated to the terminal device 130, which reduces the DCI overhead. However, the transmission configuration indication (TCI) for QCL configuration to receive the same DMRS are different for the first data 135 and the second data 145 based on the frequency or time resource assignment, which allows the terminal device 130 to apply different QCL assumption for receiving the first data 135 and the second data 145.

For example shown in FIG. 4A, the frequency resource assignment 410 and 420 for the first data 135 and the second data 145 can share the same DMRS port set, while the TCI indication for the QCL configuration of the first data 135 and the second data 145 are different. The DMRS belonging to frequency resource assignment 410 is applied with one QCL configuration, while the DMRS belonging to frequency resource assignment 420 is applied with the other QCL configuration, based on the TCI indication, even for the same DMRS port index. Similarly, if the first data 135 and the second data 145 are not overlapped in time resource assignments, the QCL configuration indicated by the TCI for the first data 135 in the first time resource assignment and for the second data 145 in the second time resource assignment can be different for receiving the DMRS belonging to different time resource assignments.

The RVs of the first data 135 and the second data 145 can be same or different. The NR supports RV=0, 1, 2, 3 for a TB in a PDSCH transmission. The two RV values indicated by the control information 125 (such as a DCI) can be configured with two separate DCI fields, where bits of code points in each DCI field independently indicate a RV value. Alternatively, a DCI field can indicate an index for a RV value pair, where a pair of RV values is configured by a higher layer which consists of two RV values, that is, RV1 for the first data 135 and RV2 for the second data 145. An example of DCI indicating a pair of RV values is shown in Table 2 or 3 as below. In Table 3, the RV2 value is increased by a fixed value from RV1. Indication of a pair of RV values may reduce the DCI overhead, since some RV pairs may be not useful and never indicated.

TABLE 2

DCI indicating a RV value pair

| Code point of the DCI field | RV value pair |
| --- | --- |
| 00 | $1^{st}$ Pair: {RV1 = 0, RV2 = 0} |
| 01 | $2^{nd}$ Pair: {RV1 = 0, RV2 = 2} |
| 10 | $3^{rd}$ Pair: {RV1 = 0, RV2 = 3} |
| 11 | $4^{th}$ Pair: {RV1 = 1, RV2 = 3} |

TABLE 3

DCI indicating a RV value pair

| Code point of the DCI field | RV value pair |
| --- | --- |
| 00 | $1^{st}$ Pair: {RV1 = 0, RV2 = 2} |
| 01 | $2^{nd}$ Pair: {RV1 = 1, RV2 = 3} |
| 10 | $3^{rd}$ Pair: {RV1 = 2, RV2 = 0} |
| 11 | $4^{th}$ Pair: {RV1 = 3, RV2 = 1} |

As another example of the various manners for the terminal device 130 to determine the first parameter 112 and the second parameter 122 from the control information 125, the terminal device 130 may obtain the first parameter 112 and second parameter 122 indicated in the control information 125. In other words, the first network device 110 and the second network device 120 may explicitly indicate the first parameter 112 and the second parameter 122 in the control information 125.

For example, the first parameter 112 and the second parameter 122 explicitly indicated in the control information 125 may comprise parameters related to a MCS, a RV, QCL, or the like, and any combination thereof. In this way, the terminal device 130 may directly obtain these parameters for associated with different network devices from the control information 125. In some embodiments, in order to implicitly indicate that the first parameter 112 is associated with the first network device 110 and the second parameter 122 is associated with the second network device 120, the first parameter 112 may be arranged before the second parameter 122 in the control information 125.

As mentioned above, the control information 125 may employ various DCI formats as defined in the 3GPP specifications. For example, the control information 125 may reuse DCI format 1_1 defined in the 3GPP specifications as shown in Table 4 below.

TABLE 4

Reused DCI format 1_1

| Reused Fields | Fields with New Mapping by RRC |
| --- | --- |
| Identifier for DCI formats | Frequency domain resource assignment |
| Carrier indicator | (implicitly for f1(RA) and f2(RA)) |
| Bandwidth part indicator | Time domain resource assignment |
| VRB-to-PRB mapping | (implicitly for f1(RA) and f2(RA)) |
| PRB bundling size indicator | Antenna port(s) (for f1(RA) and f2(RA)) |
| Rate matching indicator | Modulation and coding scheme for f1(RA) |
| ZP CSI-RS trigger | New data indicator for f1(RA) |
| Downlink assignment index | Redundancy version for f1(RA) |
| TPC command for PUCCH | Modulation and coding scheme for f2(RA) |
| PUCCH resource indicator | New data indicator for f2(RA) |
| HARQ feedback timing indicator | Redundancy version for f2(RA) |
| DMRS sequence initialization | Transmission configuration indication (QCL_1 for f1(RA); QCL_2 for f2(RA)) |

In Table 4, the notations f1(RA) and f2(RA) represent first resource assignment for the first data 135 associated with the first network device 110 and second resource assignment for the second data 145 associated with the second network device 120, respectively. Other notations are defined and can be found in the 3GPP specifications. The QCL_1 and QCL_2 can be the same type as defined in NR TS 38.214. That is, QCL_1 and QCL_2 can be both Type A, Type_D, or Type A+D. Alternatively or additionally, a new DCI format may be defined for the control information 125. Table 5 as below is an example of such a new DCI format.

TABLE 5

New DCI format

Identifier for DCI formats
Carrier indicator
VRB-to-PRB mapping
PRB bundling size indicator
Downlink assignment index
TPC command for PUCCH
PUCCH resource indicator
HARQ feedback timing indicator
HARQ process number
New data indicator
Antenna port set(s)
Transmission configuration indication
Frequency domain resource assignment(s)
Time domain resource assignment(s)
Modulation and coding scheme (s)
Redundancy version(s)

In Table 5, any of the fields for the Antenna port set, the Frequency domain resource assignment, the Time domain resource assignment, the Modulation and coding scheme, and the Redundancy version can be RRC configured to indicate for either or both of the first data 135 transmission associated with the first network device 110 and the second data 145 transmission associated with the second network device 120, respectively. Other notations are defined and can be found in the 3GPP specifications.

Referring back to FIG. 2, at block 230, the terminal device 130 performs, based on the first parameter 112 and the second parameter 122, the communication of the first data 135 with the first network device 110 and the communication of the second data 145 with the second network device 120. In some embodiments, the terminal device 130 may receive, based on the first parameter 112 and the second parameter 122, the first data 135 from the first network device 110 and the second data 145 from the second network device 120. In some other embodiments, the terminal device 130 may transmit, based on the first parameter 112 and the second parameter 122, the first data 135 to the first network device 110 and the second data 145 to the second network device 120. In other words, embodiments of the present disclosure are applicable to both downlink and uplink communications.

Figure 7A:
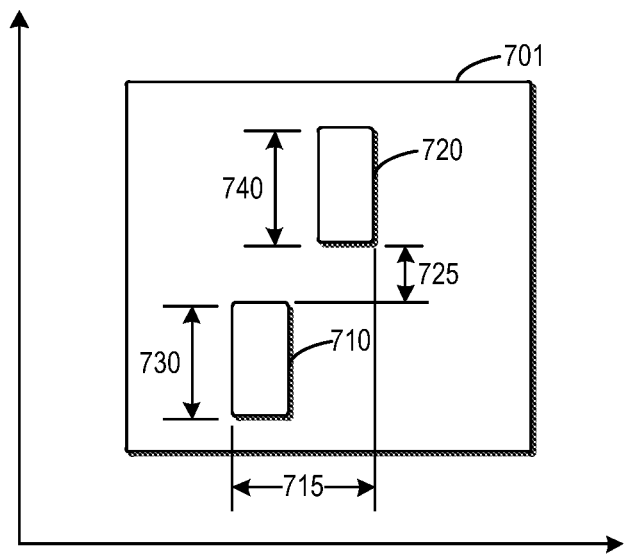
FIGS. 7A-7B show an example of intra-slot hopping for one network device and an example of inter-slot hopping for one network device, respectively.
Figure 7B:
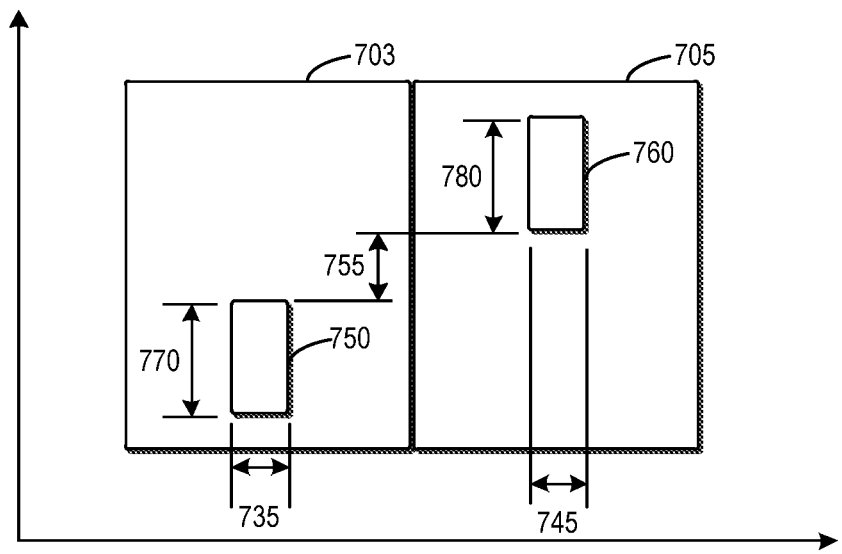

In the communications of the first data 135 and the second data 145, frequency hopping may be employed. FIGS. 7A-7B show an example of intra-slot hopping for one network device and an example of inter-slot hopping for one network device, respectively. In FIGS. 7A-7B, the horizontal axis represents time resources and the vertical axis represents frequency resources. In particular, FIG. 7A shows an example of intra-slot hopping for one network device. In the example of FIG. 7A, the network device may indicate in control information (for example, a DCI with a certain format as defined in 3GPP specifications) to a terminal device a period 715 and a first frequency resource 730. Then, according to a predefined hopping rule, the network device transmits a first half 710 of data in a first half of the period 715 using the first frequency resource 730.

Subsequently, the network device transmits a second half 720 of the data in a second half of the period 715 using a second frequency resource 740. The second frequency resource 740 has a predefined offset for hopping from the first frequency resource 730, which may also be referred to as a frequency hopping. It is noted that the hopping from the first frequency resource 730 to the second frequency resource 740 is performed in one slot 701, so that this type of hopping is known as an intra-slot hopping.

FIG. 7B shows an example of inter-slot hopping for one network device. Similar to the example of FIG. 7A, in the example of FIG. 7B, the network device may indicate in control information (for example, a DCI with a certain format as defined in 3GPP specifications) to a terminal device a period 735 and a first frequency resource 770. Then, according to a predefined hopping rule, the network device transmits a first copy 750 of data in a first period 735 using the first frequency resource 770.

Subsequently, the network device transmits a second copy 760 of the data in a second period 745 using a second frequency resource 780. The first period 735 and the second period 745 are indicated in the control information by a same start and time duration within in a slot. The second frequency resource 780 has a predefined offset 755 for hopping from the first frequency resource 750, which may also be referred to as a frequency hopping. It is noted that the hopping from the first frequency resource 770 to the second frequency resource 780 is performed across two slots 703 and 705, so that this type of hopping is known as an inter-slot hopping.

Figure 8A:
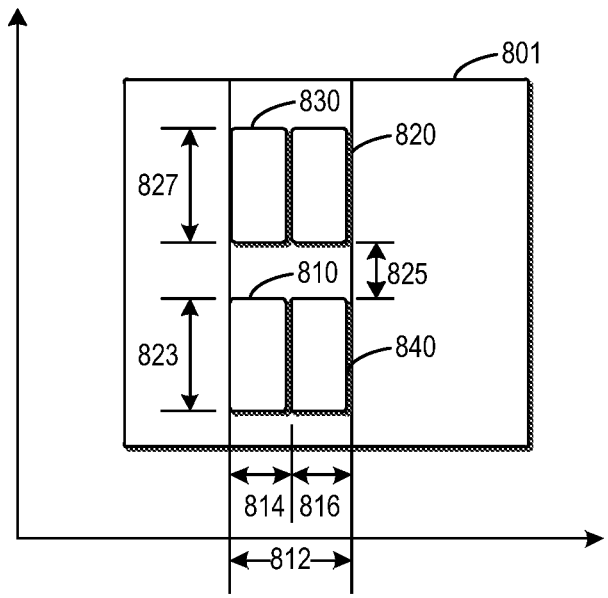
FIGS. 8A-8B show two examples of intra-slot hopping for two network devices in accordance with some embodiments of the present disclosure.
Figure 8B:
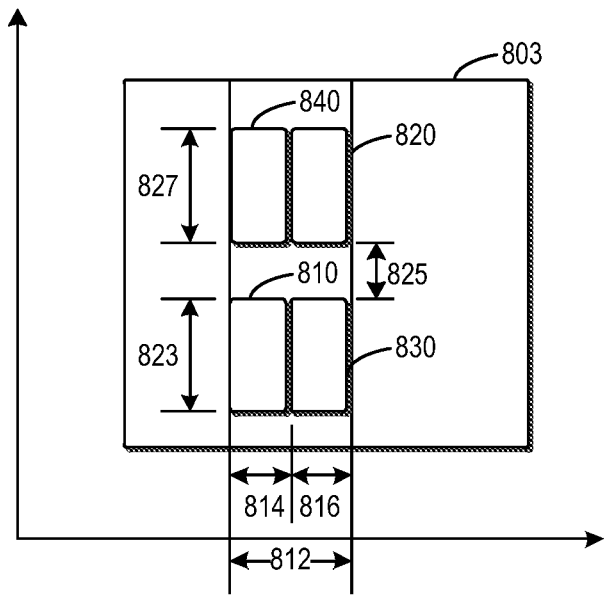

FIGS. 8A-8B show two examples of intra-slot hopping for two network devices in accordance with some embodiments of the present disclosure. In particular, FIG. 8A shows an example of intra-slot hopping for the first network device 110 and the second network device 120. In FIG. 8A, the horizontal axis represents time resources and the vertical axis represents frequency resources.

In the example of FIG. 8A, in performing the communication of the first data 135 with the first network device 110, the terminal device 130 may perform, during a first portion 814 of a period 812 indicated in the control information 125, communication of a first portion 810 of the first data 135 using a first frequency resource 823 indicated in the control information 125. Also, the terminal device 130 may perform, during a second portion 816 of the period 812, communication of a second portion 820 of the first data 135 using a second frequency resource 827 having a predefined offset 825 from the first frequency resource 823.

In addition, in performing the communication of the second data 145 with the second network device 120, the terminal device 130 may perform, during the first portion 814 of the period 812, communication of a first portion 830 of the second data 145 using the second frequency resource 827. The first portion 830 of the second data 145 corresponds to the first portion 810 of the first data 135. Also, the terminal device 130 may perform, during the second portion 816 of the period 812, communication of the second portion 840 of the second data 145 using the first frequency resource 823. The second portion 840 of the second data 145 corresponds to the second portion 820 of the first data 135.

That is, in either of the first portion 814 and the second portion 816 of the period 812, the terminal device 130 may receive two copies of a same portion of the identical first and second data. In this way, the terminal device 130 may receive the data transmitted from the first network device 110 and the second network device 120 with higher reliability.

In some embodiments, the duration of each of the first portion 814 and the second portion 816 may be half of the duration of the period 812 indicated in the control information 125. Also, the first portion 810 and the second portion 820 may be a first half and a second half of the first data 135, and the first portion 830 and the second portion 840 may be a first half and a second half of the second data 145. Further, the terminal device 130 may receive the first portion 810 and the second portion 820 of the first data 135 from the first network device 110 using a first QCL configuration indicated in the control information 125, and the first portion 830 and the second portion 840 of the second data 145 from the second network device 120 using a second QCL configuration indicated in the control information 125. Alternatively, the terminal device 130 may use both the first and second QCL configurations indicated in the control information 125 to receive data duration the period 812.

FIG. 8B shows another example of intra-slot hopping for the first network device 110 and the second network device 120. In FIG. 8B, the horizontal axis represents time resources and the vertical axis represents frequency resources. In the example of FIG. 8B, the manner in which the terminal device 130 receives the first data 135 from the first network device 110 is the same as that in FIG. 8A, and thus will not be repeated here.

Different from FIG. 8A, in the example of FIG. 8B, in performing the communication of the second data 145 with the second network device 120, the terminal device 130 may perform, during the first portion 814 of the period 812, communication of the second portion 840 of the second data 145 using the second frequency resource 827. Then, the terminal device 130 may perform, during the second portion 816 of the period 812, communication of the first portion 830 of the second data 145 using the first frequency resource 823. That is, in either of the first portion 814 and the second portion 816 of the period 812, the terminal device 130 may receive two different portions of the identical first and second data. In this way, the terminal device 130 may receive the entire transmitted data in either of the first portion 814 and the second portion 816 of the period 812.

In some embodiments, the duration of each of the first portion 814 and the second portion 816 may be half of the duration of the period 812 indicated in the control information 125. Also, the first portion 810 and the second portion 820 may be a first half and a second half of the first data 135, and the first portion 830 and the second portion 840 may be a first half and a second half of the second data 145. Further, the terminal device 130 may receive the first portion 810 and the second portion 820 of the first data 135 from the first network device 110 using a first QCL configuration indicated in the control information 125, and the first portion 830 and the second portion 840 of the second data 145 from the second network device 120 using a second QCL configuration indicated in the control information 125. Alternatively, the terminal device 130 may use both the first and second QCL configurations indicated in the control information 125 to receive data duration the period 812.

In the examples of FIGS. 8A and 8B, the terminal device 130 may receive the first portion 810 of the first data 135 and the first portion 830 of the second data 145, and the second portion 820 of the first data 135 and the second portion 840 of the second data 145. If the first portion 810 of the first data 135 is identical to the first portion 830 of the second data 145, and the second portion 820 of the first data 135 is identical to the second portion 840 of the second data 145, the terminal device 130 may combine the first portion 810 of the first data 135 and the first portion 830 of the second data 145, and also combine the second portion 820 of the first data 135 and the second portion 840 of the second data 145. In some embodiments, the combination may be maximal ratio combining (MRC). In some other embodiments, the combination may be any combining algorithms.

Figure 9A:
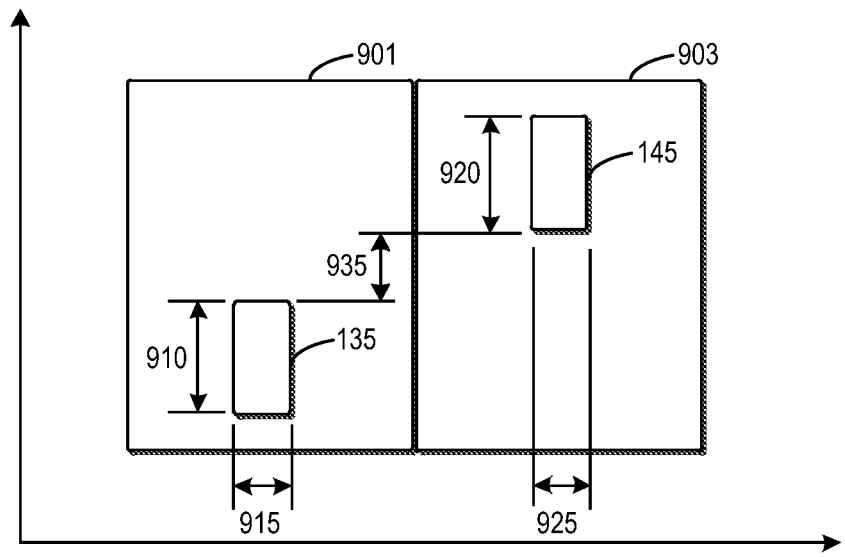
FIGS. 9A-9D show four examples of inter-slot hopping for two network devices in accordance with some embodiments of the present disclosure.

FIGS. 9A-9D show four examples of inter-slot hopping for two network devices in accordance with some embodiments of the present disclosure. In particular, FIG. 9A shows an example of inter-slot hopping for the first network device 110 and the second network device 120. In FIG. 9A, the horizontal axis represents time resources and the vertical axis represents frequency resources. In the example of FIG. 9A, in the performing the communication of the first data 135 with the first network device 110, the terminal device 130 may perform, during a first period 915, the communication of the first data 135 using a first frequency resource 910 indicated in the control information 125. Also, the terminal device 130 may perform, during a second period 925, the communication of the second data 145 using a second frequency resource 920 having a predefined offset 935 from the first frequency resource 910. In some embodiments, the predefined offset 935 can be zero.

In some embodiments, the control information 125 may indicate the start and time duration within a slot, which is applied for both the first period 915 and the second period 925. That is, the first period 915 and the second period 925 may have same start and time duration indicated in the control information 125 within a slot, and the first period 915 and the second period 925 may be located in different slots 901 and 903. For example, the first period 915 and the second period 925 are located in corresponding positions in two consecutive slots 901 and 903.

Figure 9B:
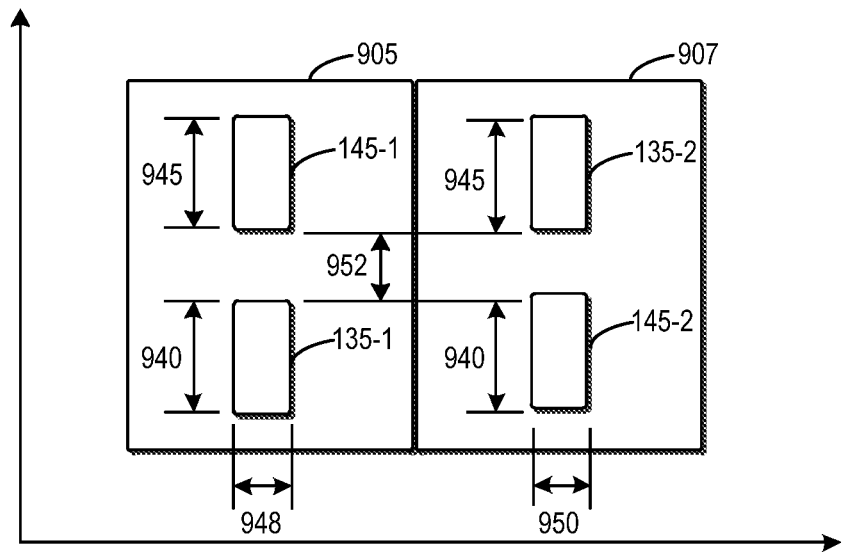

FIG. 9B shows another example of inter-slot hopping for the first network device 110 and the second network device 120. In FIG. 9B, the horizontal axis represents time resources and the vertical axis represents frequency resources. In this example of FIG. 9B which may also be referred to as inter-slot switched hopping, in performing the communication of the first data 135 with the first network device 110, the terminal device 130 may perform, during a first period 948, communication of a first copy 135-1 of the first data 135 using a first frequency resource 940 indicated in the control information 125. Also, the terminal device 130 may perform, during a second period 950, communication of a second copy 135-2 of the first data 135 using a second frequency resource 945 having a predefined offset 952 from the first frequency resource 940.

In some embodiments, the first period 948 and the second period 950 may be located in different slots 905 and 907. The control information 125 may indicate the start and time duration within a slot, which is applied for both the first period 948 and the second period 950. That is, the first period 948 and the second period 950 may have same start and time duration indicated in the control information 125 within a slot, and the first period 948 and the second period 950 may be located in different slots 905 and 907. For example, the first period 948 and the second period 950 are located in corresponding positions in two consecutive slots 905 and 907.

In addition, in performing the communication of the second data 145 with the second network device 120, the terminal device 130 may perform, during the first period 948, communication of a first copy 145-1 of the second data 145 using the second frequency resource 945. Also, the terminal device 130 may perform, during the second period 950, communication of a second copy 145-2 of the second data 145 using the first frequency resource 940. In some embodiments, the transmissions of the first data 135 and the second data 145 are indicated with different QCL configurations by the TCI indication.

Figure 9C:
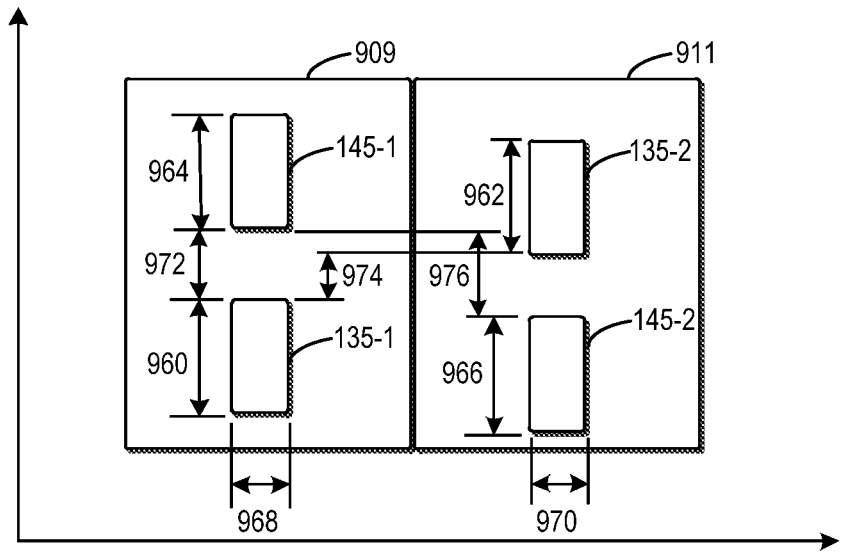

FIG. 9C shows a further example of inter-slot hopping for the first network device 110 and the second network device 120. In FIG. 9C, the horizontal axis represents time resources and the vertical axis represents frequency resources. In this example of FIG. 9C which may also be referred to as inter-slot multi-offset hopping, in performing the communication of the first data 135 with the first network device 110, the terminal device 130 may perform, during a first period 968, communication of a first copy 135-1 of the first data 135 using a first frequency resource 960 indicated in the control information 125. Also, the terminal device 130 may perform, during a second period 970, communication of a second copy 135-2 of the first data 135 using a second frequency resource 962 having a first predefined offset 974 from the first frequency resource 960.

In some embodiments, the first period 968 and the second period 970 may be located in different slots 909 and 911. The control information 125 may indicate the start and time duration within a slot, and the start and time duration is applied for both the first period 968 and the second period 970. For example, the first period 968 and the second period 970 are located in corresponding positions in two consecutive slots 909 and 911.

In addition, in performing the communication of the second data 145, the terminal device 130 may perform, during the first period 968, communication of a first copy 145-1 of the second data 145 using a third frequency resource 964 having a second predefined offset 972 from the first frequency resource 960. Also, the terminal device 130 may perform, during the second period 970, communication of a second copy 145-2 of the second data 145 using a fourth frequency resource 966 having a third predefined offset 976 from the third frequency resource 964.

Figure 9D:
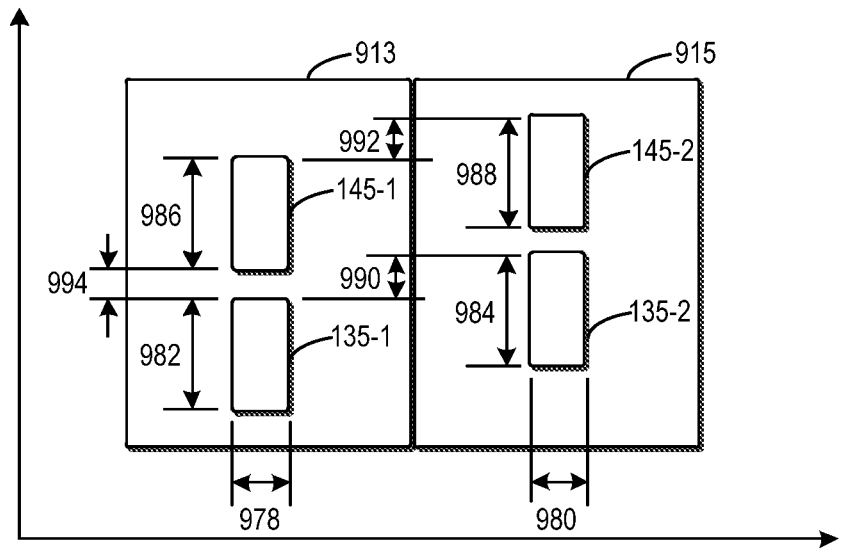

FIG. 9D shows a still further example of inter-slot hopping for the first network device 110 and the second network device 120. In FIG. 9D, the horizontal axis represents time resources and the vertical axis represents frequency resources. In this example of FIG. 9D, in performing the communication of the first data 135 with the first network device 110, the terminal device 130 may perform, during a first period 978, communication of a first copy 135-1 of the first data 135 using a first frequency resource 982 indicated in the control information 125. Also, the terminal device 130 may perform, during a second period 980, communication of a second copy 135-2 of the first data 135 using a second frequency resource 984 having a first predefined offset 990 from the first frequency resource 982.

In some embodiments, the first period 978 and the second period 980 may be located in different slots 913 and 915. The control information 125 may indicate the start and time duration within a slot, and the start and time duration is applied for both the first period 978 and the second period 980. For example, the first period 978 and the second period 980 are located in corresponding positions in two consecutive slots 913 and 915.

In addition, in performing the communication of the second data 145, the terminal device 130 may perform, during the first period 978, communication of a first copy 145-1 of the second data 145 using a third frequency resource 986 having a second predefined offset 994 from the first frequency resource 982. Also, the terminal device 130 may perform, during the second period 980, communication of a second copy 145-2 of the second data 145 using a fourth frequency resource 988 having a third predefined offset 992 from the third frequency resource 986. In some embodiments, the value of the offset 990 can be the same as that of the offset 992. In some embodiments, the transmissions of the first data 135 and the second data 145 are indicated with different QCL configurations by the TCI indication.

Figure 10:
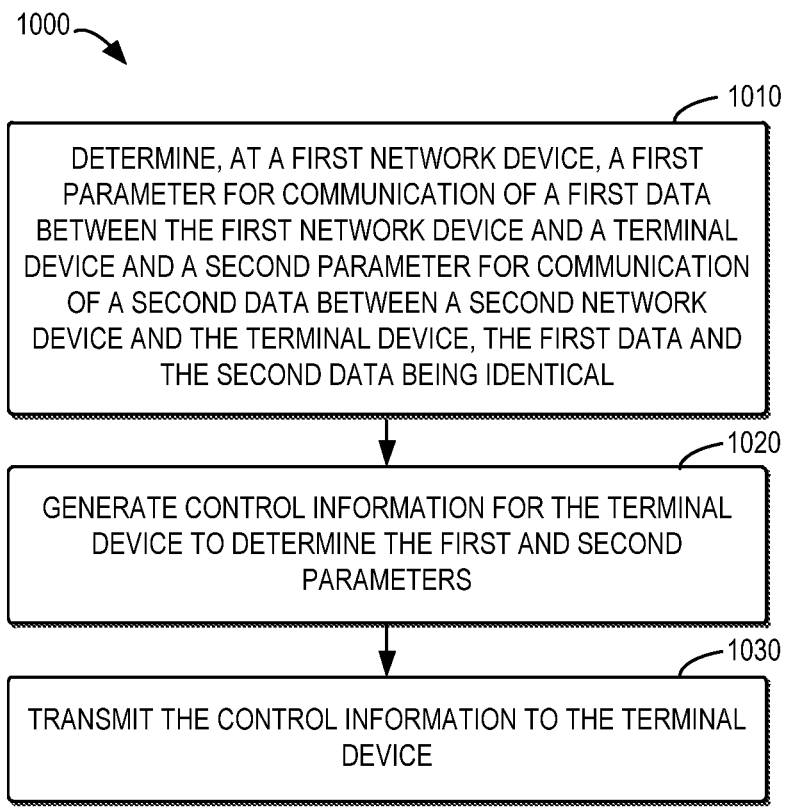
FIG. 10 shows a flowchart of another example method in accordance with some embodiments of the present disclosure.

FIG. 10 shows a flowchart of another example method 1000 in accordance with some embodiments of the present disclosure. The method 1000 can be implemented at a network device, such as the network device 110 as shown in FIG. 1. Additionally or alternatively, the method 1000 can also be implemented at the network device 120 and other network devices not shown in FIG. 1. For the purpose of discussion, the method 1000 will be described with reference to FIG. 1 as performed by the network device 110. It is appreciated that the method 1000 may be performed by the network device 110 in a manner corresponding to that of method 200. Therefore, the method 1000 may be understood with reference to the method 200 and may not be described in detail in the following.

At block 1010, the first network device 110 determines a first parameter 112 for communication of a first data 135 between the first network device 110 and a terminal device 130 and a second parameter 122 for communication of a second data 145 between a second network device 120 and the terminal device 130. The first data 135 and the second data 145 are identical.

In some embodiments, the first network device 110 may determine the second parameter 122 based on a predefined relation between the first parameter 112 and the second parameter 122.

In some embodiments, the first parameter 112 may comprise a first frequency resource and the second parameter 122 may comprise a second frequency resource, and the first network device 110 may determine the second frequency resource based on the first frequency resource and a predefined offset between the first and second frequency resources.

In some embodiments, in response to determining that a first MCS for the first network device 110 to transmit the first data 135 is different from a second MCS for the second network device 120 to transmit the second data 145, the first network device 110 may determine a second amount of the second frequency resource different from a first amount of the first frequency resource.

In some embodiments, the predefined offset between the first and second frequency resources is a negative offset, such that the first and second frequency resources are overlapped with each other.

In some embodiments, the first parameter may comprise a first frequency resource and the second parameter may comprise a second frequency resource, and the first network device 110 may determine the first frequency resource from a first set of resources, and determine the second frequency resource from a second set of resources interleaving with the first set of resources.

In some embodiments, the first parameter may comprise a first period and the second parameter may comprise a second period, and the first network device 110 may determine the first period as a first portion of a period and determine the second period as the first portion or a different second portion of the period.

In some embodiments, the first network device 110 may determine the first and second parameters as identical. In these embodiments, the first and second parameters may comprise parameters related to at least one of: a HARQ, an ARI, a NDI, a DAI, a DMRS seed, and a set of DMRS ports.

At block 1020, the first network device 110 generates control information 125 for the terminal device 130 to determine the first parameter 112 and the second parameter 122.

In some embodiments, the first network device 110 may indicate the first parameter 112 and the second parameter 122 in the control information 125. In some embodiments, the first parameter 112 and the second parameter 122 may comprise parameters related to at least one of a MCS, a RV, and QCL.

In some embodiments, the first network device 110 may arrange the first parameter 112 before the second parameter 122 in the control information 125.

At block 1030, the first network device 110 transmits the control information 125 to the terminal device 130.

In some embodiments, in transmitting the control information 125, the first network device 110 may scramble the control information 125 using a unique RNTI.

In some embodiments, the first network device 110 may perform, during a first portion of a period indicated in the control information 125, communication of a first portion of the first data 135 using a first frequency resource indicated in the control information 125. During the first portion of the period, the second network device 120 may performs communication of one of a first portion and a second portion of the second data 145 using a second frequency resource having a predefined offset from the first frequency resource. The first portion and the second portion of the second data 145 may correspond to the first portion and the second portion of the first data 135, respectively.

In addition, in these embodiments, the first network device 110 may perform, during a second portion of the period, communication of a second portion of the first data 135 using the second frequency resource. During the second portion of the period, the second network device 120 may perform communication of the other one of the first portion and the second portion of the second data 145 using the first frequency resource.

In some embodiments, the first network device 110 may perform, during a first period, the communication of the first data 135 using a first frequency resource indicated in the control information 125. In addition, the second network device 120 may perform, during a second period, the communication of the second data 145 using a second frequency resource having a predefined offset from the first frequency resource. The first period and the second period are located in corresponding positions in two consecutive slots.

In some embodiments, the first network device 110 may perform, during a first period, communication of a copy of the first data 135 using a first frequency resource indicated in the control information 125. During the first period, the second network device 120 may perform communication of a copy of the second data 145 using a second frequency resource having a predefined offset from the first frequency resource.

In addition, in these embodiments, the first network device 110 may perform, during a second period, communication of a second copy of the first data 135 using the second frequency resource. During the second period, the second network device 120 may perform communication of a second copy of the second data 145 using the first frequency resource. The first period and the second period are located in corresponding positions in two consecutive slots.

In some embodiments, the first network device 110 may perform, during a first period, communication of a copy of the first data 135 using a first frequency resource indicated in the control information 125. During the first period, the second network device 120 may perform communication of a copy of the second data 145 using a second frequency resource having a first predefined offset from the first frequency resource.

In addition, in these embodiments, the first network device 110 may perform, during a second period, communication of a second copy of the first data 135 using a third frequency resource having a second predefined offset from the first frequency resource. During the second period, the second network device 120 may perform communication of a second copy of the second data 145 using a fourth frequency resource having a third predefined offset from the second frequency resource. The first period and the second period are located in corresponding positions in two consecutive slots.

Figure 11:
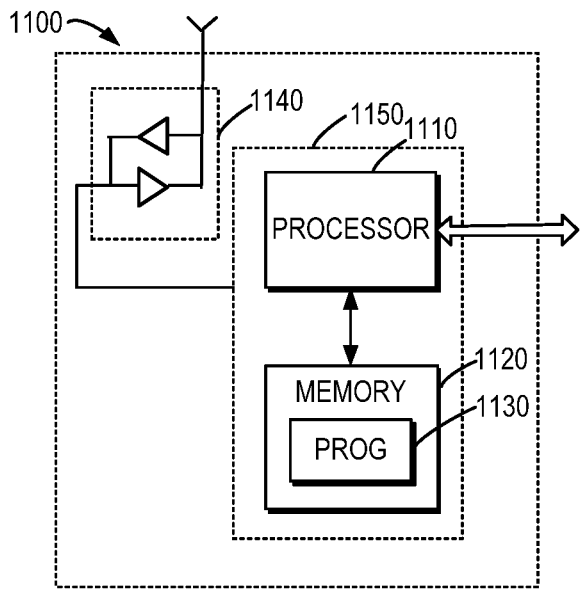
FIG. 11 is a simplified block diagram of a device that is suitable for implementing some embodiments of the present disclosure.

FIG. 11 is a simplified block diagram of a device 1100 that is suitable for implementing some embodiments of the present disclosure. The device 1100 can be considered as a further example embodiment of the network devices 110 and 120 as well as the terminal device 130 as shown in FIG. 1. Accordingly, the device 1100 can be implemented at or as at least a part of the network devices 110, 120 and the terminal devices 130.

As shown, the device 1100 includes a processor 1110, a memory 1120 coupled to the processor 1110, a suitable transmitter (TX) and receiver (RX) 1140 coupled to the processor 1110, and a communication interface coupled to the TX/RX 1140. The memory 1120 stores at least a part of a program 1130. The TX/RX 1140 is for bidirectional communications. The TX/RX 1140 has at least one antenna to facilitate communication, though in practice an Access Node mentioned in this application may have several ones. The communication interface may represent any interface that is necessary for communication with other network elements, such as X2 interface for bidirectional communications between gNBs or eNBs, Si interface for communication between a Mobility Management Entity (MME)/Serving Gateway (S-GW) and the gNB or eNB, Un interface for communication between the gNB or eNB and a relay node (RN), or Uu interface for communication between the gNB or eNB and a terminal device.

The program 1130 is assumed to include program instructions that, when executed by the associated processor 1110, enable the device 1100 to operate in accordance with the embodiments of the present disclosure, as discussed herein with reference to FIG. 2 or 10. The embodiments herein may be implemented by computer software executable by the processor 1110 of the device 1100, or by hardware, or by a combination of software and hardware. The processor 1110 may be configured to implement various embodiments of the present disclosure. Furthermore, a combination of the processor 1110 and memory 1120 may form processing means 1150 adapted to implement various embodiments of the present disclosure.

The memory 1120 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1120 is shown in the device 1100, there may be several physically distinct memory modules in the device 1100. The processor 1110 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2 and 10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for communication performed by a terminal device, the method comprising:
   receiving first control information from a first network device;
   determining a second parameter based on a first parameter indicated by the first control information and a preconfigured offset value; and
   performing a first communication with the first network device based on the first parameter and a second communication with a second network device based on the second parameter,
   wherein the first communication and the second communication correspond to a same transport block,
   wherein the first parameter indicates a first time domain resource allocation for the first communication, and
   wherein a second time duration of the second communication is the same as a first time duration of the first communication.

2. The method of claim 1, wherein the first control information is received in a Downlink Control Information (DCI) format.

3. The method of claim 1,
   wherein the first control information indicates a value corresponding to a first redundancy version (RV) of the first communication and a second RV of the second communication, and
   wherein a second value of the second RV is a sum of a first value of the first RV and the preconfigured offset value.

4. The method of claim 1, wherein the preconfigured offset value is configured by a Radio Resource Control (RRC) signaling.

5. The method of claim 1, wherein the preconfigured offset value is equal to or larger than 0.

6. A method of communication performed by a first network device, the method comprising:
   sending first control information to a terminal device; and
   performing a first communication with the terminal device based on a first parameter indicated by the first control information,
   wherein a second parameter is determined by the terminal device based on the first parameter and a preconfigured offset value,
   wherein a second communication between the terminal device and a second network device is performed based on the second parameter, and
   wherein the first communication and the second communication correspond to a same transport block,
   wherein the first parameter indicates a first time domain resource allocation for the first communication, and
   wherein a second time duration of the second communication is the same as a first time duration of the first communication.

7. The method of claim 6, wherein the first control information is transmitted in a Downlink Control Information (DCI) format.

8. The method of claim 6,
   wherein the first control information indicates a value corresponding to a first redundancy version (RV) of the first communication and a second RV sequence of the second communication, and
   wherein a second value of the second RV is a sum of a first value of the first RV and the preconfigured offset value.

9. The method of claim 6, wherein the preconfigured offset value is configured by a Radio Resource Control (RRC) signaling.

10. The method of claim 6, wherein the preconfigured offset value is equal to or larger than 0.

11. A terminal device comprising:
a processor; and
a memory storing instructions,
wherein the processor is configured to execute the instructions to cause the terminal device to:
receive first control information from a first network device;
determine a second parameter based on a first parameter indicated by the first control information and a preconfigured offset value; and
perform a first communication with the first network device based on the first parameter and a second communication with a second network device based on the second parameter,
wherein the first communication and the second communication correspond to a same transport block,
wherein the first parameter indicates a first time domain resource allocation for the first communication, and
wherein a second time duration of the second communication is the same as a first time duration of the first communication.

12. The terminal device of claim 11, wherein the first control information is received in a Downlink Control Information (DCI) format.

13. The terminal device of claim 11,
wherein the first control information indicates a value corresponding to a first redundancy version (RV) of the first communication and a second RV of the second communication, and
wherein a second value of the second RV is a sum of a first value of the first RV and the preconfigured offset value.

14. The terminal device of claim 11, wherein the preconfigured offset value is configured by a Radio Resource Control (RRC) signaling.

15. The terminal device of claim 11, wherein the preconfigured offset value is equal to or larger than 0.

16. A first network device, comprising:
a processor; and
a memory storing instructions,
wherein the processor is configured to execute the instructions to cause the first network device to:
send first control information to a terminal device; and
perform a first communication with the terminal device based on a first parameter indicated by the first control information,
wherein a second parameter is determined by the terminal device based on the first parameter and preconfigured offset value,
wherein a second communication between the terminal device and a second network device is performed based on the second parameter, and
wherein the first communication and the second communication correspond to a same transport block,
wherein the first parameter indicates a first time domain resource allocation for the first communication, and
wherein a second time duration of the second communication is the same as a first time duration of the first communication.

* * * * *